United States Patent [19]

Borman

[11] 4,128,526
[45] Dec. 5, 1978

[54] COPOLYESTERS OF POLY(ALKYLENE GLYCOL AROMATIC ACID ESTERS) AND DIESTERS COMPRISING AROMATIC DIOLS

[75] Inventor: Willem F. H. Borman, Evansville, Ind.

[73] Assignee: General Electric Company, Pittsfield, Mass.

[21] Appl. No.: 753,862

[22] Filed: Dec. 23, 1976

[51] Int. Cl.$^2$ .............................................. C08G 63/18
[52] U.S. Cl. ........................... 260/40 R; 260/45.7 P; 260/45.75 B; 260/DIG. 24; 528/273
[58] Field of Search .................. 260/47 C, 49, 40 R, 260/45.75 B, 45.7 P, DIG. 24

[56] References Cited

U.S. PATENT DOCUMENTS

| 3,047,536 | 7/1962 | Gordon | 260/47 |
|---|---|---|---|
| 3,278,640 | 10/1966 | Goldberg et al. | 260/860 |
| 3,341,154 | 9/1967 | Howes | 244/75 R |
| 3,557,053 | 1/1971 | Miller | 260/45.7 P |
| 3,671,487 | 6/1972 | Abolins | 260/40 R |
| 3,681,281 | 8/1972 | Juelke et al. | 260/40 R |
| 3,772,405 | 11/1973 | Hamb | 260/860 |
| 3,830,771 | 8/1974 | Cohen et al. | 260/40 R |
| 3,833,685 | 9/1974 | Wambach | 260/860 |
| 3,915,926 | 10/1975 | Wambach | 260/40 R |
| 3,936,400 | 2/1976 | Wambach | 521/138 |

*Primary Examiner*—Lester L. Lee
*Attorney, Agent, or Firm*—Morgan, Finnegan, Pine, Foley & Lee

[57] ABSTRACT

Novel thermoplastic copolyesters useful in molding resins are prepared by the interesterification of (a) diaromatic acids and diols and/or reactive derivatives thereof or terminally-reactive straight, branched or alicyclic poly(alkylene glycol aromatic acid esters) and (b) a terminally-reactive di-ester comprising an aromatic diol. Compositions comprising the new modified copolymers produce molded articles with superior impact strength, higher heat deflection temperatures, and modified crystallization behavior. Also disclosed are embodiments including reinforcing agents, and/or flame retardant agents.

10 Claims, No Drawings

COPOLYESTERS OF POLY(ALKYLENE GLYCOL AROMATIC ACID ESTERS) AND DIESTERS COMPRISING AROMATIC DIOLS

This invention relates to novel thermoplastic copolyesters prepared by the interesterification of (a) diaromatic acids and diols and/or reactive derivatives thereof or terminally-reactive straight, branched or dicyclic poly(alkylene glycol aromatic acid esters) and (b) a di-ester comprising an aromatic diol.

BACKGROUND OF THE INVENTION

Poly(alkylene glycol aromatic acid esters) have found use in molding resins because of their rigidity, good dimensional stability, low water absorption and good electrical properties. These resins also produce molded articles having high heat resistance, inherent lubricity and excellent chemical resistance. One restriction on the use of these valuable resins, however, is the fact that the impact strengths of moldings tend to be somewhat inadequate for applications where the molded part is likely to be subjected to severe service conditions. This has led to work to upgrade these properties of poly(alkylene glycol aromatic acid esters) because, both in straight, branched and cyclic alkylene chain modifications, they are so superior to many other molding materials, especially with respect to surface gloss when molded.

It has now been discovered that if poly(alkylene glycol aromatic acid ester) resins are chemically modified by being segmented in a copolyester in which the major portion of the repeating units are (a) poly(alkylene glycol aromatic acid ester) units and the minor portion of the repeating units are units of (b) a di-ester comprising an aromatic diol, then the resulting copolyesters will have enhanced impact resistance, compared to the resin (a) itself. The improvement in impact resistance is achieved with minimal loss of other physical properties and is accompanied with a measurable increase in toughness. It is believed that the presence of the internal units of other aromatic di-esters modifies the rate at which such poly(alkylene glycol aromatic ester) resins crystallize from the melt in a very desirable manner.

Illustratively, if certain aromatic diol-containing di-esters are added to the reactor during the preparation of poly(1,4-butylene terephthalate) by ester interchange between dimethyl terephthalate and 1,4-butanediol, either as part of the initial charge, or after the prepolymerization stage is complete, or if they are reacted with a terminally-reactive poly(1,4-butylene terephthalate) resin, there is caused a most desirable modification in the properties of the resulting, modified polyester molding resins.

By way of illustration, succinic anhydride and maleic anhydride are each reacted, respectively, with bisphenol-A to produce carboxyl-terminated di-esters, and these are used as the source of units. These carboxyl-terminated di-esters are added, respectively, to a reactor with 1,4-butanediol and dimethyl terephthalate and dibutyl tin dilaurate and heated under moderate, then high vacuum until the formation of copolyester is substantially complete. Alternatively, 1,4-butanediol and dimethyl terephthalate can be heated to form β-hydroxyethyl terephthalate, the di-ester added, and the copolyester is formed on further heating. In still another procedure, the di-ester derived from the aromatic diol is reacted with high molecular weight poly(1,4-butylene terephthalate) having functionally reactive end groups, and a small amount of 1,4-butanediol and copolymerization occurs.

No matter how they are made, however, after completion of the reaction and molding the copolyesters, the articles obtained are improved in toughness and reduced in notch sensitivity as compared to bars molded from the corresponding unmodified poly(alkylene aromatic acid esters). There is insubstantial loss in flex modulus and strength.

The effect on crystallization behavior is also noteworthy. The aromatic diol-derived di-ester components significantly reduce the crystallization rate of the molding resin. This is desirable, since it allows longer time for the polymer melt to flow through thin walled sections of a mold before the cooling product solidifies.

In addition to their use in injection molding application, the di-ester coreactants have also been found to be beneficial in improving the properties of poly(alkylene glycol aromatic acid ester) resins used in other applications, such as profile extrusion, extrusion-and injection blow molding, thermoforming, foam molding; in these cases small amounts of ester-forming branching agents may be added to enhance the melt elasticity properties of the products for easier processing.

The copolyester products can also be converted to valuable modifications by adding reinforcing fillers, such as glass fibers, talc, and the like, and/or flame retardant agents such as monomolecular or polymeric halogenated aromatic compounds, with and without flame retardant synergists, such as antimony compounds, or phosphorus compounds, and the like. Surprisingly, the increased toughness of the new copolyesters compensates for the greater brittleness usually induced by the incorporation of such non-soluble additives and fillers.

DESCRIPTION OF THE INVENTION

According to this invention, there are provided novel thermoplastic copolyesters which comprise units derived from:

(a) (i) a dicarboxylic acid selected from one or more of the group consisting of terephthalic acid, isophthalic acid, naphthalene dicarboxylic acids, phenyl indane dicarboxylic acid and compounds of the formula:

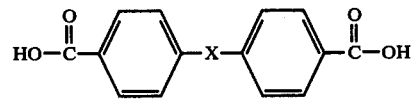

in which X is alkylene of from 1 to 4 carbon atoms, carbonyl, sulfonyl, oxygen or a bond between the benzene rings, or a reactive-derivative thereof, and (ii) one or more straight chain, branched chain or cyclic aliphatic diols of from 2 to 10 carbon atoms or a reactive-derivative thereof, or (iii) a terminally-reactive polyester derived from (i) and (ii); and (b) a terminally-reactive di-ester of an aromatic diol of from 6 to 30 carbon atoms, said units being connected by interterminal linkages consisting essentially of ester linkages.

It is essential that the modified polyester products be prepared in such a way that there is a reaction of terminally-reactive groups as between components (a) and (b). The terminal groups can be in the glycol or aromatic diacid monomer of component (a), in prepolymer thereof, or in resinous higher condensation products comprising component (a). The terminal groups can comprise hydroxyl, carboxyl, carboalkoxy, and the like, including reactive derivatives thereof. The result of reaction between two terminally-reactive groups, of course, must be an ester linkage. After initial mixing, polymerization is carried out under standard conditions, e.g., a first stage, if monomers comprise component (a) at from 150° to 210° C. and a mild vacuum, e.g., 1 to 20 mm. of Hg, and a second stage (first, if a prepolymer or resinous poly(alkylene glycol aromatic diester) is used as component (a), at a higher temperature, e.g., 220° to 280° C., in a high vacuum, e.g., 0.1 to 2 mm. Hg, to form the copolymerizate of this invention.

Component (a) is preferably a mixture or an esterification product of terephthalic acid or isophthalic acid or a reactive derivative thereof or a mixture thereof, and one or more alkylene glycols. The alkylene glycols can be straight chain, branched chain, or alicyclic in nature. Illustratively, the glycol can be ethylene glycol, 1,3-propanediol, 1,4-butanediol; 1,5-pentanediol; 1,6-hexanediol; 1,9-nonanediol; 1,10-decanediol; neopentyl glycol; 1,4-cyclohexanediol; 1,4-cyclohexane dimethanol, a mixture of any of the foregoing, or the like.

The di-esters designated (b) are most preferably derived from an aromatic diol or a reactive derivative thereof and a dibasic acid or reactive derivative thereof, such as an anhydride. Also useful would be the reaction product of an aromatic alcohol of mixed ester forming functionality such as p-hydroxybenzoic acid, or a reactive derivative thereof, and a dibasic acid or reactive derivative thereof, such as an anhydride, although this is not, in a strict sense, a di-ester, per se.

The di-esters designated component (b) preferably will contain at least one carboxy or carboalkoxy terminal group.

In a preferred family of di-ester component (b), the aromatic diol is represented by the formulas:

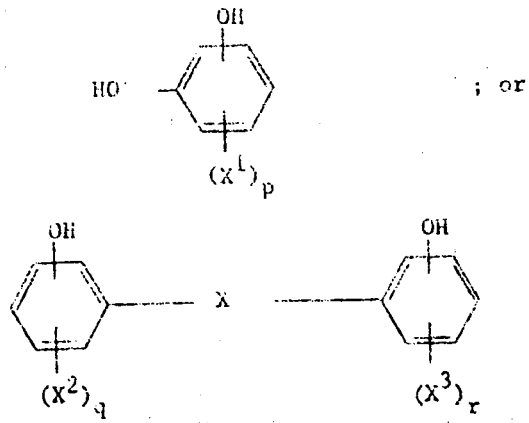

wherein X is alkylene or alkylidene of from 1 to 4 carbon atoms, carbonyl, sulfonyl, oxygen or a bond between the benzene rings, $X^1$, $X^2$ and $X^3$ are selected from hydrogen, $C_1-C_6$ alkyl, chlorine or bromine, and p, q and r are from 1 to 4.

Illustrative of the aromatic diols useful in component (b) are: bisphenol-A, hydroquinone, resorcinol, 3,3',5,5'-tetramethyl-4,4'-bisphenol, tetrabromobisphenol-A, tetrachlorobisphenol-A, and the like. Illustrative of the acids used to form the ester forming adducts in component (b) are phthalic acid or anhydride, tetrabromophthalic acid or anhydride, succinic acid or anhydride, maleic acid or anhydride, and the like. Preferred components (b) are derived from bisphenol-A and succinic anhydride and from bisphenol-A and maleic anhydride, by means to be exemplified hereinafter.

The copolyesters of this invention preferably comprise from 95 to 50 parts by weight of the units of poly(alkylene glycol aromatic diacid esters), preferably poly(1,4-butylene terephthalate). The polyester component will preferably have an intrinsic viscosity of above 0.1 dl./g. and preferably, between 0.1 and 0.5 dl./g. as measured in a 60:40 mixture of phenol/tetrachloroethane at 30° C. The balance, 5 to 50 parts by weight of the copolyester will comprise units of component (b).

As will be understood by those skilled in this art, the poly(alkylene glycol aromatic acid ester) units (a) can be straight chain or branched, e.g., by use of a branching component, e.g., 0.05 to 3 mole %, based on aromatic ester units, of a branching component which contains at least three ester-forming groups. This can be a polyol, e.g., pentaerythritol, trimethylolpropane, and the like, or a polybasic acid compound, e.g., trimethyl trimesate, and the like.

The copolyesters may be employed as such in the fabrication of molded articles or they may be blended with other polymers, especially preferably poly(1,4-butylene terephthalate) straight chain or branched (as described), and with stabilizers, reinforcing agents and/or flame retardant additives.

Suitable reinforcing agents are well known but, illustratively, they may be selected from the group consisting of metals, such as aluminum, iron or nickel particles and the like, and non-metals, such as carbon filaments, silicates, such as acicular calcium silicate, asbestos, titanium dioxide, potassium titanate and titanate whiskers, wollastonite, glass flakes and fibers. It is also to be understood that unless the filler adds to the strength and stiffness of the composition, it is only a filler and not a reinforcing filler as contemplated herein.

Although it is only necessary to have at least a reinforcing amount of the reinforcement present, in general the reinforced compositions will comprise from 10 to 80% by weight of the total composition of the reinforcing agent.

In particular, the preferred reinforcing fillers are of glass, and it is usually preferred to employ fibrous glass filaments comprised of lime-aluminum borosilicate glass that is relatively soda free. This is known as "E" glass. However, other glasses are useful where electrical properties are not important, e.g., the low soda glass known as "C" glass. The filaments are made by standard processes, e.g., by steam or air blowing, flame blowing and mechanical pulling. The filament diameters range from about 0.00012 to 0.00075 inch, but this is not critical to the present invention. Glass fibers may be surface coated in accordance with standard procedures to improve their reinforcing performances. In general, best properties will be obtained from reinforced compositions that contain from 20 to 30 percent by weight of the glass reinforced composition.

The length of glass filaments and whether or not they are bundled into fibers and the fibers bundled in turn to yarns, ropes or rovings, or woven into mats, and the like, are also not critical to the practice of the invention. In preparing the present compositions, it is convenient to use the filamentous glass in the form of chopped strands of from about ⅛ inch to about 1 inch long, preferably less than ¼ inch long. In articles that are molded from the compositions of the invention, even shorter lengths will be encountered because, during compounding, considerable fragmentation will occur. This is desirable, however, because the best properties are exhibited by thermoplastic injection molded articles in which the filament lengths lie between about 0.000005 inch and 0.12 (⅛ inch).

The present invention also contemplates flame retardant compositions comprising the new copolyesters with or without reinforcing agent. Illustrative flame retardants are disclosed in U.S. Pat. Nos. 3,833,685, 3,341,154, 3,915,926 and 3,671,487 which are hereby incorporated by reference. Other flame retardants are disclosed in U.S. Pat. Nos. 3,681,281, and 3,557,053, 3,830,771 and U.K. Pat. No. 1,358,080, all of which are incorporated by reference.

In general, the flame retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame retardant additive comprises a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame retardant additive used is not critical to the invention, so long as it is present in a minor proportion based on said composition — major proportions will detract from physical properties — but at least sufficient to render the block polyester resin non-burning or self-extinguishing. Those skilled in the art are well aware that the amount will vary with the nature of the resin and with the efficiency of the additive. In general, however, the amount of additive will be from 0.5 to 50 parts by weight per 100 parts of resin. A preferred range will be from about 3 to 40 parts and an especially preferred range will be from about 8 to 40 parts of additive per 100 parts of resin. Smaller amounts of compounds highly concentrated in the elements responsible for flame retardance will be sufficient, e.g., elemental red phosphorus will be preferred at 0.5 to 2.0 parts by weight per 100 parts of resin, while phosphorus in the form of triphenyl phosphate will be used at 25 parts of phosphate per 100 parts of resin, and so forth. Halogenated aromatics will be used at 8 to 50 parts and synergists, e.g., antimony oxide will be used at about 2 to 5 parts by weight per 100 parts of resin.

Among the useful halogen-containing compounds are those of the formula:

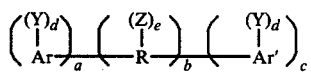

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfur-containing linkage, e.g., sulfide, sulfoxide, sulfone; a phosphorus-containing linkage; and the like. R can also consist of two or more alkylene or alkylidene linkages connected by such groups as aromatic, amino, ether, carbonyl, sulfide, sulfoxide, sulfone, a phosphorus-containing linkage, and the like. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic, or organometallic radicals. The substituents represented by Y include (1) halogen, e.g., chlorine, bromine, iodine, or fluorine or (2) ether groups of the general formula OE, wherein E is a monovalent hydrocarbon radical similar to Z or (3) monovalent hydrocarbon groups of the type represented by R or (4) other substituents, e.g., nitro, cyano, etc., said substituents being essentially inert provided there be at least one and preferably two halogen atoms per aryl, e.g., phenyl nucleus.

Z is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups such as cyclopentyl, cyclohexyl, and the like; as well a monovalent hydrocarbon groups containing inert substituents therein. It will be understood that where more than one Z is used, they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b and c represent whole numbers including 0. When b is not 0, neither a nor c may be 0. Otherwise either a or c, but not both, may be 0. Where b is 0, the aromatic groups are joined by a different carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenyls of which the following are representative:

2,2-bis-(3,5-dichlorophenyl)propane
bis-(2-chlorophenyl)methane
bis-(2,6-dibromophenyl)methane
1,1-bis-4(4-iodophenyl)ethane
1,2-bis-(2,4-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bormophenyle)ethane
2,6-bis-(4,6-dichloronaphthyl)propane
2,2-bis-(2,6-dichlorophenyl)pentane
2,2-bis-(3,5-dichlorophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane
2,2-bis-(3,5-dibromo-4-hydroxyphenyl)propane The preparation of these and other applicable biphenyls are known in the art. In place of the divalent aliphatic group in the above examples may be substituted sulfide, sulfoxy, and the like.

Included within the above structural formula are substituted benzenes exemplified by 1,3-dichlorobenzene, 1,4-dibromobenzene, 1,3-dichloro-4-hydroxybenzene, hexachlorobenzene, hexabromobenzene, and biphenyls such as 2,2'-dichlorobiphenyl, 2,4'-dibromobiphenyl, and 2,4'-dichlorobiphenyl.

Preferred flame retardant additives consist of aromatic carbonate homopolymers having repeating units of the formula:

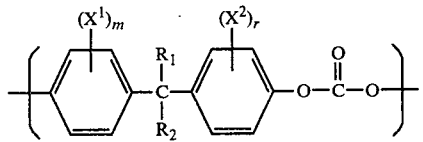

wherein $R^1$ and $R^2$ are hydrogen, (lower)alkyl or phenyl, $X^1$ and $X^2$ are bromo or chloro and m and r are from 1 to 4. These materials may be prepared by techniques well known to those skilled in the art. Also preferred are aromatic carbonate copolymers in which from 25 to 75 weight percent of the repeating units comprise chloro- or bromo-substituted dihydric phenol, glycol or dicarboxylic acid units. See, e.g., A. D. Wambach, U.S. Pat. No. 3,915,926, above-mentioned.

In addition, preferred are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene or oxygen group and having at least two chlorine or bromine atoms per phenyl nucleus, and mixtures of at least two of the foregoing.

In general, the preferred phosphorus compounds are selected from elemental phosphorus or organic phosphonic acids, phosphonates, phosphinates, phosphonites, phosphinites, phosphene oxides, phosphenes, phosphites or phosphates. Illustrative are triphenyl phosphine oxide. This can be used alone or mixed with hexabromobenzene or a chlorinated biphenyl and, optionally, antimony oxide.

Typical of the preferred phosphorus compounds to be employed in this invention would be those having the general formula:

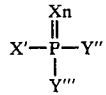

in which X = S or O, and n = 0 or 1, Y', Y'' and Y''' are the same or different and represent alkyl, cycloalkyl, aryl, alkyl substituted aryl, halogen substituted aryl, aryl substituted alkyl, alkyloxy, cycloalkyloxy, halogen substituted alkyloxy, aryloxy, halogen substituted aryloxy, or halogen. Two of the Y's may be combined into a cyclic structure, or one or two of the Y's may be difunctional in which case the compounds consists of short or long chain compounds containing a plurality of P atoms per molecule. Typical examples of suitable phosphorous compounds include: triphenyl phosphate, diphenyl phenyl phosphonate, phenyl diphenyl phosphinate, triphenyl phosphine, triphenyl phosphine oxide, tris(p-bromophenyl) phosphate, neopentyl phenyl phosphonate, tris(dibromopropyl) phosphate, dibenzyl phenyl phosphonate, poly(1,4 cyclo hexylene dimethylene) phenyl phosphonate, pentaerythritol bis(p bromophenyl) phosphonate, and the like. A preferred flame retardant is tris(tribromophenyl) phosphate.

Also suitable as flame retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl) phosphine oxide or tetrakis(hydroxymethyl) phosphonium chloride. These flame retardant additives are commercially available.

DESCRIPTION OF THE PREFERRED EMBODIMENTS

The following examples illustrate the present invention, but they are not to be construed to limit it in any manner whatsoever. All parts are by weight, unless otherwise indicated.

EXAMPLE 1

(a) An adduct of succinic anhydride and 2,2-bis-(4-hydroxy phenyl) propane (BPA) is prepared by reacting 2.5 g. of BPA, 2.4 g. of succinic anhydride and 0.5 ml of triethylamine in 10 ml. of refluxing methylene chloride until all is dissolved. $MeCl_2$ is distilled off and the residue left to solidify. The product is recrystallized from acetone. The reaction product is homogeneous by thin layer chromatography, shows a sharp melting peak at 137° C. by differential scanning calorimetry, and has an infrared spectrum consistent with the assumed structure of BPA disuccinate.

(b) 1.15 g. of 2,2-bis(4-hydroxyphenyl)propane (BPA) and 1.05 g. of succinic anhydride are placed in a 250 × 20 mm cylindrical glass reactor provided with a mechanically driven, hermetically sealed spiral glass stirring rod and distillation attachment for removal of volatile reaction by-products. The reactor is immersed in a silicone oil bath heated to 150° C. for a period of 20 minutes, causing the reactants to melt and coreact. After removing the reactor from the oil bath and cooling its contents, 20 g. of poly(1,4-butylene terephthalate) (PBT) is added. The PBT has an intrinsic viscosity of 0.41 dl./g. as determined in a 60:40 by weight solvent mixture of phenol and sym.-tetrachloroethane at 30° C., and contains a catalyst residue remaining from 0.1 mole % tetra(2-ethylhexyl)titanate added during the preparation of the PBT.

The reactor is again immersed in the oil bath and heated for 35 minutes at a gradually increasing temperature from 200°–233° C. At that time, an increasing vacuum is gradually applied to the reactor contents, while the temperature is raised further, until after 20 minutes the temperature is 252° C. and the vacuum 0.1 mm of mercury.

After addition of 0.1 ml. of 1,4-butanediol to the reaction mixture, the polymerization is continued for 90 minutes at 252° C. and 0.1–0.3 mm Hg. The product, after removal from the reactor, is tough and ductile and has an I.V. of 0.84 dl./g.

The crystallization rate of the material at 200° F. is determined by melting a small particle between microscope coverslips on a hot plate at 450° F. and rapidly transferring it to a microscope hot stage kept at 200° F. between crossed polarizers. The increase in light transmission as the sample crystallizes is measured and recorded. The time to initial crystallization ($t_i$) is 2.1 seconds, and the additional time required to achieve 50% of the final crystallinity ($t_{1/2}$) is 0.3 seconds. In comparison, a sample of PBT homopolymer has a $t_i = 1.5$ secs. and a $t_{1/2} = 0.2$ secs.

EXAMPLE 2

Bisphenol-A, 1.15 g. and 1.05 g. succinic anhydride are pre-reacted as in Example 1 and cooled. 18.4 g. of dimethyl terephthalate, 13 g. of 1,4-butanediol, and 0.05 ml. of dibutyl tin dilaurate are added, and the mixture heated 20 minutes at 180° C., 65 minutes at 200° C., and 35 minutes at 220° C. At this time, distillation of methanol has stopped. A vacuum is now applied gradually to the reaction and heating continued for an additional 2 hours, final reaction conditions are 252° C. at 0.05 mm Hg.

The reaction product is removed from the reactor. It has an I.V. of 0.71 dl./g.

The sample has a $t_i = 9$ sec. and $t_{1/2} = 0.3$ secs. at 200° F. Differential scanning calorimetry gives a melting peak starting at 187° C. with a maximum of 212° C. and a crystallization peak starting at 186° C. with a maximum at 164° C.

EXAMPLE 3

Maleic anhydride, 1.03 g., and 1.15 of BPA are reacted with 20 g. of PBT (I.V. = 0.41 dl./g.) as described in Example 2. The reaction product is quite tough and has an I.V. of 0.865 dl./g.

Among the variations possible in the invention in light of the detailed examples, there can be substituted for 1,4-butanediol, other glycols such as ethylene glycol, 1,4-cyclohexane dimethanol, and the like, and for dimethyl terephthalate, dimethyl isophthalate, dimethyl naphthalene dicarboxylate, and the like, as well as the corresponding prepolymers and terminally-reactive high polymers. For the dibutyl tin dilaurate, there can be substituted other transesterification catalysts, such as zinc salts, antimony oxide or esters, and the like. For the bisphenol-A, there can be substituted other aromatic diols, such as hydroquinone, resorcinol, tetrabromobisphenol-A, and the like. For the succinic anhydride or the maleic anhydride, there can be substituted phthalic anhydride, tetrabromophthalic anhydride, and the like. Reinforced compositions can be obtained by intimately blending, e.g. 30 parts by weight of glass fiber reinforcement with 70 parts by weight of the copolyesters of Examples 1-3. Reinforced, flame retardant compositions can be provided by making an intimate blend comprising 52 parts by weight of the copolyester of Examples 1-3, 30 parts of ⅛ inch long chopped filamentous glass reinforcement, 13 parts by weight of a 1:1 copolycarbonate of bisphenol-A and tetrabromobisphenol-A (27% bromine-modified Procedure A-U.S. Pat. No. 3,936,400) and 5 parts by weight of antimony oxide.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A thermoplastic copolyester prepared by heating at from 150° C. to 280° C. and a pressure of from 0.1 to 20 mm Hg. and reacting:

(a) (i) a dicarboxylic acid selected from one or more of the group consisting of terephthalic acid, isophthalic acid, naphthalene dicarboxylic acids, phenyl indane dicarboxylic acid and compounds of the formula:

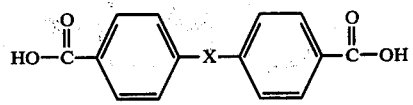

in which X is alkylene of from 1 to 4 carbon atoms, carbonyl, sulfonyl, oxygen or a bond between the benzene rings and (ii) one or more straight chain, branched chain or cyclic aliphatic diols of from 2 to 10 carbon atoms or (iii) a polyester prepared by heating (i) and (ii); and (b) a di-ester of an aromatic diol of from 6 to 30 carbon atoms.

2. A thermoplastic copolyester as defined in claim 1 wherein component (b) is prepared by forming a di-ester from a diol of the formula:

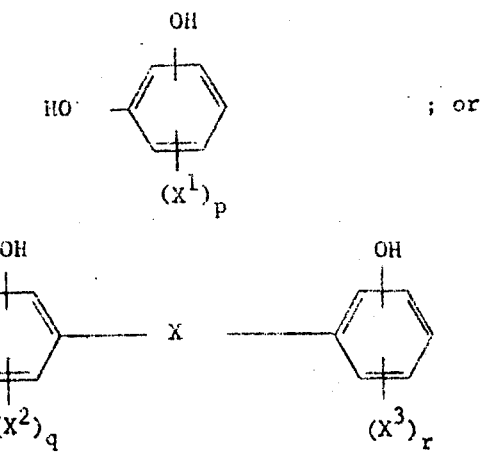

wherein X is alkylene or alkylidene of from 1 to 4 carbon atoms, carbonyl, sulfonyl, oxygen or a bond between the benzene rings, $X^1$, $X^2$ and $X^3$ are selected from hydrogen, lower alkyl, chlorine or bromine, and p, q and r are from 1 to 4.

3. A thermoplastic copolyester as defined in claim 1 wherein component (a) is of the formula:

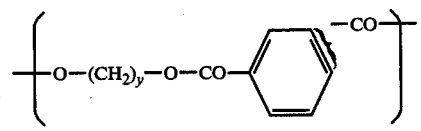

wherein y is from 2 to 10.

4. A thermoplastic copolyester as defined in claim 1 wherein component (b), is prepared by forming a di-ester from a diol of the formula:

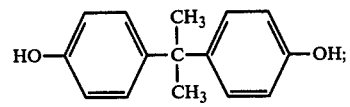

and succinic anhydride.

5. A thermoplastic copolyester as defined in claim 1 wherein component (b) is prepared by forming a diester from a diol of the formula:

and maleic anhydride.

6. A thermoplastic copolyester as defined in claim 3 wherein component (a) includes from 0.05 to 3 mole %, based on the terephthalate units, of a branching component which contains at least three ester-forming groups, selected from a polyol or a polybasic acid compound.

7. A thermoplastic molding composition comprising a copolyester as defined in claim 1 and a reinforcing amount of a reinforcing filler.

8. A thermoplastic molding composition as defined in claim 7 wherein said reinforcing agent comprises filamentous glass.

9. A thermoplastic molding composition comprising a copolyester as defined in claim 1 and a flame retardant amount of a flame retardant agent.

10. A thermoplastic molding composition as defined in claim 7 which also includes a flame retardant amount of a flame retardant agent.

UNITED STATES PATENT AND TRADEMARK OFFICE
CERTIFICATE OF CORRECTION

PATENT NO. : 4,128,526
DATED : December 5, 1978
INVENTOR(S) : Willem F.H. Borman It is certified that error appears in the above-identified patent and that said Letters Patent are hereby corrected as shown below:

Column 9, line 20, "9 sec." should read -- 1.9 sec. -- .

Signed and Sealed this

Twenty-fifth Day of September 1979

[SEAL]

Attest:

LUTRELLE F. PARKER
Attesting Officer     Acting Commissioner of Patents and Trademarks